Patented Jan. 5, 1937

2,067,020

UNITED STATES PATENT OFFICE 2,067,020

EXPANDED RUBBER

Dudley Roberts, New York, N. Y., assignor to Rubatex Products, Inc., New York, N. Y., a corporation of Delaware No Drawing. Application April 3, 1934, Serial No. 718,875

8 Claims. (Cl. 18—53)

My invention relates to novel expanded rubber material and to a novel method of making the same.

Numerous efforts have been made to produce a hard rubber of the same physical characteristics such as compressibility, hardness, tensile strength, etc., as is obtained with a piece of hard rubber made of the same constituents, with the added advantage of lightness, minimum consumption of rubber for a predetermined volume and superior heat and sound insulation. The latter property is obtained by reason of the cellular structure of the product and the inert gases sealed and mechanically contained in the individual cells. For best results the cells should be as small as mechanically feasible and of uniform size. Each cell may then be regarded as producing an arch, the most efficient known means for transferring stresses. Weak spots such as might be produced by irregular sizes and shapes of cells are thus avoided.

In general the proposed methods for manufacturing such a product may be divided into two distinct and different groups, one being a froth or sponge rubber; the second being the distinctly different expanded rubber.

Thus it has been proposed to produce sponge rubber for expanded rubber by impregnating it with chemicals which yield gases at vulcanizing temperatures or by introducing the gases by mechanical treatment such as heating, stirring and kneading the rubber dough under an atmosphere of gas. It has also been proposed to make an expanded rubber by injecting gas into the mass.

In the case of sponge rubber the process is carried on so that the cells are relatively large in size and are not sealed from each other. The vulcanization is carried on only to a limited degree so that a relatively soft rubber is produced, the whole making a spongy cellular rubber mass which takes up and absorbs water.

None of these processes has been commercially successful due to many critical conditions which were not recognized heretofore. The product resulting from these processes either failed to expand sufficiently, or if it did expand, soon contracted, losing a considerable portion of its expanded volume. In some cases it was proposed to inject air into the rubber at high pressure and at temperatures. The oxygen in the air at the high temperatures employed oxidized the unstable rubber, producing a brittle, crumbly product. The pressures necessary for this operation were so high that the size of the apparatus that could be used was necessarily restricted, and accordingly, two stages were necessary, one in which partial vulcanization and partial expansion took place in a relatively small autoclave at exceedingly high pressures, followed by a record stage of complete vulcanization and complete expansion in full sized apparatus. I have discovered a process involving much lower pressures so that the operations may be completed in a single stage.

Moreover, it was not recognized that rubber, like metal, may become fatigued, or to express this otherwise, may distort its molecular alignment when it is worked very intensely, and thus destroy its properties.

It has also been suggested that a finely granulated charcoal be mixed with the rubber and a gas be admitted at high pressure. But to bring about the adsorption and absorption of gas by charcoal requires very special processes.

I have discovered that in making an expanded rubber which will have the desirable properties, such as tensile and compressive strength, lightness, uniform porosity and long life without contraction, it is important to obtain a thorough impregnation of the constituents entering the rubber; it is essential that following each stage of operation, suitable rest periods be provided to restore the rubber to its original molecular arrangement to prevent fatigue and therefore destruction of the rubber; it is necessary that the gas employed for the expansion be an inert gas which will not combine with the active rubber; that in the chemical process employing granulated charcoal, the charcoal be first freed from any occluded gases and thereafter subjected to gas under heat and pressure for the occlusion in the charcoal of the desired gas, and only thereafter mixed with the rubber; and that the proper pressures be applied for controlling the emission of gas.

By satisfying all of these conditions unerringly, I have been successful in producing an expanded rubber of substantially uniform cellular structure and containing within the cells a gas, extremely light and having a relatively low coefficient of heat and sound conduction.

Accordingly, an object of my invention is to provide a novel expanded gassed rubber and a novel process of making the same.

A further object of my invention is to provide a novel process for making expanded rubber in which the ingredients are first thoroughly impregnated and suitable rest periods, permitting restoration of the rubber, are provided intermediate the stages of working the rubber.

Still a further object of my invention is to provide novel apparatus for and methods of introducing inert gas into an evacuated vessel containing the rubber dough.

Another object of my invention is to provide novel processes of expanding rubber which comprises subjecting the rubber to an inert gas at a relatively low pressure.

A still further object of my invention is to provide a novel process of expanding rubber which comprises mixing rubber with air-freed gas-occluded charcoal particles and subjecting the rubber to vulcanizing temperatures.

In manufacturing my novel expanded rubber, a considerable amount of hydrogen sulphide is formed during vulcanization, producing a disagreeable odor. I have found that this occurs particularly when a fresh cut or hole is made in the rubber product, showing that this gas is imprisoned in the body of the rubber.

I have discovered that I can remove substantially all of this hydrogen sulphide by subjecting the finished rubber product to heat and a negative pressure or vacuum sufficient to draw all of the hydrogen sulphide from the cells.

Accordingly, a further object of my invention is to provide novel methods of and means for removing undesired gases from the rubber.

Still another object of my invention is to provide novel methods of and means for removing hydrogen sulphide from the expanded rubber.

Still a further object of my invention is to subject the expanded rubber to successive evacuation processes for the purpose of removing hydrogen sulphide.

Another object of my invention is to provide a process for replacing the hydrogen sulphide by other gases which produce pleasing odors There are other objects of my invention which, together with the foregoing will appear in the detailed description which is to follow.

In carrying out my invention, the ingredients entering into the product are mixed in approximately the following percentages by weight:

| | Per cent |
|---|---|
| Washed first grade pale crepe or smoked rubber | 40–75 |
| Sulphur | 6–30 |
| Light calcined magnesia | 3– 5 |
| Ground gilsonite | 12 |
| Lower melting bituminous substances | 12 |

The base ingredient of the product is the rubber which is preferably of a pale crepe Grade #1, obtained in sheets about $\frac{1}{32}''$ to $\frac{1}{16}'' \times 10'' \times 20''$.

These sheets of rubber are passed through masticating mills consisting of two rollers rotating in opposite directions as in the case of meshing gears. One roller, however, rotates slightly faster than the other, so that the rubber fed between the rolls tends to rub on the surfaces of the different rolls and a nib is formed. The extent of this nib depends on the relative speeds of the rolls and the nib in turn determines how much of the two surfaces of the rubber engage and are masticated by the respective rolls.

The rolls are steam heated to a temperature of approximately 150° F. as the rubber sheets are fed between them. The rubber is masticated or softened in this process, the individual sheets combining into a single mass of soft rubber, the degree of mastication depending on the spacing of the rolls, the temperature and the period of operation. I have found, however, that a mastication of one pound per minute at a roller temperature of 150° F. is sufficient for my purposes.

To this resulting soft rubber mass is now added an asphalt product or soft bitumen, such as suffron or mineral rubber. This asphalt is divided into fine particles and passed through a sixteen mesh sieve. While the rubber revolves on the masticating rolls, these particles of bitumen are shovelled on and are uniformly distributed over the rubber. The heat of the rubber melts the bitumen which penetrates into and is absorbed by the rubber.

The bitumen acts as a flux at low temperatures in the stage of partial vulcanization to be explained hereinafter. Any other low temperature flux may be substituted, i. e., a low melting hydrocarbon of the asphaltic group of a bituminous or waxy nature, having fluxing properties, such as paraffin wax and stearic acid. During this stage the rubber has turned from a light to a dark color.

Ground gilsonite, divided into even finer particles than bitumin and passed through a one hundred and sixty mesh sieve, is now sprinkled or shovelled on the rubber, still passing through the masticating rolls. Gilsonite is an asphalt like bitumen, but has a much higher melting point. It will accordingly not be melted by the rubber, but will nevertheless penetrate into, impregnate and be absorbed by the soft spongy mass of rubber. Gilsonite functions as a flux in a high temperature stage to be described hereinafter, and may accordingly be replaced by any suitable high temperature flux such as a high temperature asphalt. In using the expression "flux" it will be understood that I mean a substance to soften or help amalgamate different impediments and to assist in the vulcanizing.

Summarizing the above, three stages have been described. In the first, the rolls were heated to a temperature of 150° F. while masticating or softening the rubber to combine the individual sheets into a single soft spongy mass. Assuming twenty-four pounds of rubber, twenty-four minutes may ordinarily be required for this operation.

In the second stage, a low temperature flux is applied to the rubber as it continues to pass over the rolls, in the proportions given above, and this, by reason of the heat, melts into and is absorbed by the rubber.

In the third stage, a high temperature flux is admixed with the rubber while it passes through the rolls, again in the proportions given above.

The second and third stages take fourteen minutes additional to the twenty-four minutes for mastication and result in a rubber impregnated with a high and low temperature hydrocarbon. The molecular structure of rubber is theoretically described as normally being in the form of a spiral. This may be thought as giving to the rubber its elasticity and strength. During the working of the rubber described above, a disturbance of the molecular structure apparently occurs and the rubber tends to lose its natural qualities.

I have discovered that it is essential to provide a rest period for the rubber at this stage of the operations to permit the rubber to restore itself to its original condition.

Accordingly in the next or fourth stage, the rubber now flat, soft and porous, is permitted to cool off and is left to rest for about twelve hours, preferably in a dark dry room at a temperature of from 80° to 100° F. The longer the rest period, the more the rubber regains its original conditions, but I have found that twelve hours will ordinarily be sufficient to restore it to about its original condition.

Following this rest period, these slabs of rubber are placed on rolls maintained at temperatures of from 120° to 130° F. As the rubber passes between the rolls, additional slabs are added, which ultimately combine into a soft mass of rubber. When the mass has been formed with adjacent engaging surfaces adhering, sulphur and light calcined magnesia, in the proportions given above, are added as the rolls rotate. Sulphur is the vulcanizer and the light calcined magnesia is the rubber toughener. Any equivalent rubber toughener, such as zinc oxide, may replace the calcined magnesia. For thorough absorption, the rolling is continued for a period of about twenty minutes.

The product is now removed from the rolls in strips or slabs of about one-half inch in thickness and two feet in length. The distorting effect of passing the rubber through the rolls is now again corrected by providing a second twenty-four hour rest period in a dark, warm, dry room at about the same temperature as the previous rest period. Again the length of the rest period may vary, but at least twenty-four hours is necessary, and the longer this period, the more nearly the rubber is restored to normal.

The rubber is now placed on a warmer mill consisting of two rollers rotating at the same speed. The rubber is fed between the rolls maintained at a temperature of from 120° to 140° F. This is continued until the rubber again becomes soft and forms into a uniform plastic composite mass and during which the rubber may be formed into slabs, boards, etc., after which a further rest period of twelve hours is provided. Or, if desired, the rubber may be passed through a forcing machine which I prefer to use for mixing or for preforming the rubber in any desired shape, such as aeroplane wings, struts, pontoons, etc.

The various stages of treatment described above have resulted in agitating the rubber to such an extent that a quantity of air has been absorbed by the rubber. The presence of this air would have a serious deteriorating effect during the subsequent stages to be described hereinafter. This may be described as follows:

Like glass, rubber is a plastic or super-cooled viscous liquid. Normally it would be crystalline, but it is prevented from becoming so because of the complexity of the molecules which are large and slow-moving due to the viscosity of the mixture. This super-cooled viscous liquid is physically and chemically an unstable product which tends to stabilize itself. This is particularly true if the rubber is warmed to just below melting point which favors crystallization.

Furthermore, rubber oxidizes easily because it has unsaturations or double bonds which tend to combine with oxygen readily, especially under the influence of heat and pressure, thus making the rubber brittle. In the presence of air, rubber therefore tends to oxidize. Attacked or oxidized by even a small amount of air, the rubber becomes brittle, as is well known.

To prevent this, the rubber, as is commonly known, is vulcanized, i. e., stabilized. This consists in heating the rubber with sulphur to form a vulcanized or stable product so that it no longer tends to combine with oxygen in the air. The sulphur forms a mixture of complex compounds which prevents crystallization and oxidation.

The presence, however, of even a small quantity of air will result in an oxidation, for the reasons explained above, especially before vulcanization sets in.

Accordingly, it is important to force out all the air that may have mixed with the rubber before the stage of partial vulcanization, to be described, occurs.

To this end the rubber is passed between successive calenders maintained at a temperature of from 130° to 150° F. The calender mill comprises a series of rolls decreasingly spaced from each other in successive steps. In the first step the rolls are relatively far apart, in the next stage closer, etc. The rubber passing through the calenders forces all the trapped air out and is reduced in size. After the rubber passes the last roll, a sheet of cloth is applied thereto to close faults appearing in the rubber and to prevent the rubber from contracting. The cloth, having a limited expansion, keeps the stretch in rubber and maintains it at a predetermined thickness.

To this product, now at a low temperature and freed from substantially all injurious air, I now mix a granular charcoal or carbon. In order to assist in the application of the charcoal I soften the rubber mixture by adding a small percent of oil, such as coal tar or pine oil. The addition of this oil might be made at the time the sulphur is added. The charcoal is prepared as follows:

A quantity of a suitable activated charcoal or carbon selected so that it will pass through a hundred mesh sieve is placed in jars which can be hermetically sealed. These jars, with their tops open, are placed in an autoclave which is thereafter heated to and maintained at a temperature of 140°–180° F. for a period of approximately one-half hour.

The autoclave is then evacuated by an air pump in any suitable manner to produce a negative pressure or a substantial vacuum.

As is well known, the charcoal has a strong affinity for surrounding matter and accordingly takes up occluded gases such as air, each molecular particle of carbon absorbing a considerable number of volumes of gas greater than its own volume. It is important that all such occluded air be withdrawn from the carbon since the carbon's affinity for other gases is greatly diminished while any gas such as air is present.

Moreover, the presence of any air in the carbon, if it is driven off subsequently while the carbon is mixed with the rubber, as will be described hereinafter, will have a deleterious effect on the raw rubber prior to the vulcanization.

Accordingly the application of heat and the evacuation becomes absolutely essential in order to secure the release or detachment of the molecules of atmospheric air, especially the removal of oxygen which would have a deleterious effect on the rubber and prevent the subsequent adsorption or absorption of gases to be used.

This heating and evacuating process continues for approximately one-half hour and the charcoal is then ready to be subjected to any inert gas which does not have an affinity for sulphur, such as nitrogen or carbon dioxide, which is now admitted to the chamber under a slight pressure to bring about the greatest possible absorption and adsorption of the nitrogen gas. This activated carbon or charcoal is then cooled and kept in the containers or jars mentioned above, suitably hermetically sealed, in a cool place to prevent as far as possible the loss of the gas.

It will be understood by those skilled in the art that in the event the charcoal is to be used immediately, this safeguard is unnecessary.

The occluded or activated charcoal is now calendered into the rubber mixture in any preferred manner, such as that described in detail above, preferably at as low a temperature as possible, as for example 120° F., to prevent the loss of any gas. In this stage the rubber should not be permitted a rest period of any length, because of possible loss of gas.

Although for purposes of illustration I have described one mixture of rubber for a specific use thereof, it will be obvious that this mixture may be varied both in percentages and constituents depending upon the intended use and application for the final product.

With the rubber composition impregnated with the various elements, including the charcoal, the rubber mass, divided into as thin layers or sheets as possible of proper dimensions are placed in suitable vulcanizing molds and the entire mass is expanded wholly by heat to fill the mold and vulcanize as described.

If desired, an autoclave may be used to which a pressure may be applied to assist in the vulcanization and expansion. In any event, the principle of the invention now resides in the fact that the application of heat will cause the carbon particles to give up their occluded gases which then, on escape from the carbon, form minute cells with thin hard walls.

In carrying out this stage of the process, it is extremely important that the vulcanization and expansion take place at a relatively slow rate, the latter preceded, however, by sufficient vulcanization to prevent escape of the gas driven off from the charcoal. In order to insure such sufficient early vulcanization, it may be desirable to add an accelerator which assists the first stages of curing. Such an accelerator, which may be added with the sulphur, is di-phenol-guanidine.

As has already been explained hereinbefore, due to the deleterious action of any air that may be present, and also due to the necessarily slow process at which this stage has to be carried out, any air which is present would have a great opportunity to attack and oxidize the still unvulcanized rubber, and accordingly it is necessary that all of the air, or substantially all of the air, should previously have been forced out of the rubber and out of the charcoal. Such exclusion of air will not only safeguard against destruction of the rubber, but will also permit of a greater mixture of nitrogen with the charcoal.

In using a gassing chamber for carrying out this step of the process, I have discovered that under certain circumstances, while the gas expansion is going on as a result of the application of heat, it may be preferable to apply a negative pressure which will assist in drawing out the gases from the minute charcoal particles. Although the amount of charcoal to be added is obviously dependent on the type of product desired, I have discovered that usually this variation ranges from five to ten percent of the entire mass.

In order to control the rate of expansion and vulcanization, it may also be desirable to apply a pressure in an autoclave during this stage of vulcanization, and subsequently as shall be described hereinafter.

The objection to processes that have previously been described is the high cost of a high pressure gassing chamber, especially as the cost rises rapidly as the lateral diameter of the autoclave is increased. In fact, such is the process of manufacturing an autoclave out of a huge block of steel that practical limits are soon reached, beyond which it is impossible to go. These limits in the size of a gassing chamber in the lateral diameter, and to a lesser extent in the length of the autoclave, cause limits as to the size of a mass that is to be treated within it, and the cost rises rapidly with every additional five hundred pounds of pressure that is to be used.

A very special quality of steel-making walls, 6" to 9" in thickness must be used if gassing pressures of three or four thousand pounds to a square inch are to be developed. My process with gassing of carbon with charcoal before admixture to the rubber dough makes such high pressures unnecessary. I utilize only a relatively low pressure in an autoclave to replace some of the gas that may have dislodged from a charcoal during a manipulation and to prevent the untimely or too rapid exit of the gas from the charcoal, and too sudden expansion of the rubber dough during a partial vulcanization process.

In any event it will now be obvious that the entire process is no longer dependent on the unwieldily high pressures which were required heretofore and which necessitated a two stage process in which extremely high pressures were used in a relatively small sized autoclave and which therefore necessitated restricting the expansion and vulcanization to a partial completion to be followed subsequently by a more complete vulcanization and expansion in a larger chamber in which the high pressures were no longer needed.

The final product is an expanded hard rubber of cellular structure, each cell being in effect a minute bubble of hard rubber in contact with the next adjacent cell, and each cell being filled with a gas. When this rubber is cut, a very disagreeable odor is emitted, which is caused by the hydrogen sulphide freed from the rubber.

This objectionable odor prevents its use for many purposes, such as in containers of foodstuffs, or in fact, for any indoor use. This condition is particularly accentuated in the present product due to the fact that as the expanded rubber is cooled, the gases within these small molecules contract in volume and there is accordingly a tendency for any other gases which have been formed, such as the sulphurous gas produced as a result of the vulcanization, to flow into these cells. The rubber may then be conceived as a gas bag consisting of a multiplicity of minute cells or balloons, each filled with nitrogen and hydrogen sulphide.

When any of these cells are punctured as by cutting the composition, this hydrogen sulphide escapes and produces the disagreeable odor.

I have discovered that by placing the complete rubber product in a chamber which is subsequently evacuated to a negative pressure of approximately .001 mm., that I can extract a substantial portion of the hydrogen sulphide and thus eliminate the odors.

In one form I maintain the member in a vacuum for approximately ten minutes and then expose it to atmospheric pressure, and thereafter again to a negative pressure for ten minutes.

In another form I place the rubber in an oven which is then heated to a temperature of 120° F. and maintained at this temperature and negative pressure for approximately ten minutes. Sulphur dioxide is then introduced into the chamber at approximately atmospheric pressure and this condition is maintained for another ten minutes which is then followed again by a vacuum for approximately ten minutes.

In a further process the rubber is subjected to a negative pressure for approximately ten minutes and then filled with chlorine gas at normal pressure and the chamber is again evacuated for another ten minutes.

I discovered from these tests that the rubber in the first process still retained some disagreeable odor; that there is much less in the rubber subjected to the second process; that still better results were obtained where the sulphur dioxide was admitted to take the place of the hydrogen sulphide; and that the best results were obtained where chlorine was used for this purpose: In the latter case not only was the disagreeable odor removed, but a rather faint and pleasant odor obtained.

Both the sulphur dioxide and chlorine were used because of their reaction with hydrogen sulphide. In practice it is my intention to treat or cure the gassed rubber over a long period of time, employing excessive pressures and re-exposures to chlorine. It will be understood, however, by those skilled in the art, that the gases such as sulphur dioxide and chlorine may be replaced by many other gases which will have similar reactions or that, in fact, I may use combinations of such gases, such as using both sulphur dioxide and chlorine in successive stages of evacuation. By means of these longer and repeated terms I can completely remove all the hydrogen sulphide from the material.

It will be understood that this process for removing hydrogen sulphide does not only apply to the expanded rubber made in the preferred manner described hereinbefore by the use of occluded charcoal but may apply to expanded rubber made in any form or, for that matter, in any vulcanized rubber product which contains hydrogen sulphide.

Accordingly, I do not wish to be limited by the specific illustrations of my invention illustrated above, but only as set forth in the appended claims.

I claim:

1. The method of manufacturing expanded rubber which comprises masticating and milling rubber; resting the masticated rubber to restore its "nerve"; forcing out occluded air from the rubber; impregnating the rubber with air-free inert gas-occluded charcoal particles of which the inert gas does not react with rubber; and heating the rubber to expand the gases within it and consequently also expanding the rubber; and carrying vulcanization of the material to completion.

2. The method of manufacturing expanded rubber with gas occluded charcoal particles impregnated therein which comprises masticating and milling rubber; resting the masticated rubber to restore its "nerve"; forcing out occluded air from the rubber; driving off all the air occluded in the charcoal; admitting an inert gas into the charcoal for absorption thereby of which the inert gas does not react with rubber; impregnating the rubber with said charcoal particles; thereafter applying heat to the charcoal impregnated rubber to drive off the occluded gas of said charcoal; and carrying vulcanization of the material to completion.

3. The method of manufacturing expanded rubber with gas occluded charcoal particles impregnated therein which comprises masticating and milling rubber; resting the masticated rubber to restore its "nerve"; forcing out occluded air from the rubber; driving off all the air occluded in the charcoal; admitting an inert gas into the charcoal for absorption thereby of which the inert gas does not react with rubber; impregnating the rubber with said charcoal particles; thereafter applying heat to the charcoal impregnated rubber to drive off the occluded gas of said charcoal; and simultaneously vulcanizing the rubber product.

4. The method of manufacturing expanded rubber with gas occluded charcoal particles impregnated therein which comprises first mixing the rubber with ingredients for vulcanizing the rubber; masticating and milling the rubber; resting the masticated rubber to restore its "nerve"; forcing out occluded air from the rubber; driving off all the air occluded in the charcoal; admitting an inert gas into the charcoal for absorption thereby of which the inert gas does not react with rubber; impregnating the rubber with said charcoal particles; thereafter applying heat to the charcoal impregnated rubber to drive off the occluded gas of said charcoal; and simultaneously vulcanizing the rubber product.

5. The method of manufacturing expanded rubber with gas occluded charcoal particles impregnated therein which comprises first mixing the rubber with ingredients for vulcanizing the rubber; masticating and milling the rubber; resting the masticated rubber to restore its "nerve"; forcing out occluded air from the rubber; separately admitting charcoal particles to a vacuum and to heat for driving off any occluded gas; admitting an inert gas into the charcoal for absorption thereby of which the inert gas does not react with rubber; impregnating the rubber with said charcoal particles; thereafter applying heat to the charcoal impregnated rubber to drive off the occluded gas of said charcoal; and simultaneously vulcanizing the rubber product.

6. In the method of manufacturing expanded rubber, the steps which comprise masticating the rubber at a temperature of approximately 150° F. to produce a softened mass of rubber; resting the rubber for a period to restore its original "nerve"; combining slabs of rubber at temperatures of from 120° to 130° F.; again resting the rubber to restore it to normal; forcing substantially all the air from the rubber which was entrapped during the preceding steps; impregnating the rubber with air-free inert gas-occluded charcoal particles at a relatively low temperature; and vulcanizing the charcoal impregnated rubber at a relatively slow rate.

7. In the method of manufacturing expanded rubber, the steps which comprise masticating the rubber to produce a softened mass; resting the rubber to restore its "nerve"; forcing substantially all the air from the rubber; freeing charcoal from substantially all occluded air; applying heat to the charcoal for approximately one-half hour while simultaneously charging the charcoal with an inert gas; cooling the charcoal; impregnating the rubber with the gas-occluded charcoal particles at a relatively low temperature; and vulcanizing the charcoal impregnated rubber at a relatively slow rate.

8. In the method of manufacturing expanded rubber, the steps which comprise masticating the rubber to produce a softened mass; resting the rubber to restore its "nerve"; forcing substantially all the air from the rubber; freeing charcoal from substantially all occluded air; supplying heat to the charcoal for approximately one-half hour while simultaneously charging the charcoal with an inert gas; cooling the charcoal; impregnating the rubber with the gas-occluded charcoal particles at a relatively low temperature and at slightly negative pressure; and vulcanizing the charcoal impregnated rubber at a relatively slow rate.

DUDLEY ROBERTS.